(12) United States Patent
Hueber et al.

(10) Patent No.: US 10,945,206 B2
(45) Date of Patent: Mar. 9, 2021

(54) SYSTEM AND METHOD FOR CONFIGURABLE LOW-POWER WAKE-UP DETECTION

(71) Applicant: NXP B.V., Eindhoven (NL)

(72) Inventors: Gernot Hueber, Linz (AT); Pravin Pandurang Manerker, Fremont, CA (US)

(73) Assignee: NXP B.V., Eindhoven (NL)

( * ) Notice: Subject to any disclaimer, the term of this patent is extended or adjusted under 35 U.S.C. 154(b) by 225 days.

(21) Appl. No.: 16/211,228

(22) Filed: Dec. 5, 2018

(65) Prior Publication Data

US 2020/0187119 A1 Jun. 11, 2020

(51) Int. Cl.
*H04W 4/00* (2018.01)
*H04W 52/02* (2009.01)

(52) U.S. Cl.
CPC ... *H04W 52/0229* (2013.01); *H04W 52/0245* (2013.01)

(58) Field of Classification Search
None
See application file for complete search history.

(56) References Cited

U.S. PATENT DOCUMENTS

| | | | | |
|---|---|---|---|---|
| 2005/0101254 A1* | 5/2005 | Sasaki | ............. | H03F 1/3294 455/63.1 |
| 2009/0278606 A1* | 11/2009 | Lee | ............. | H03G 3/3078 330/282 |
| 2015/0145651 A1* | 5/2015 | Muellner | ............. | H03G 3/3052 340/10.33 |
| 2017/0111123 A1* | 4/2017 | Ouzounov | ............. | H04L 67/12 |

* cited by examiner

*Primary Examiner* — Zewdu A Beyen (57) ABSTRACT

This specification discloses methods and devices to enable high resolution configuration of a low-power wake-up detector (LP Detector), which in turn is implemented allowing for very coarse threshold detection (i.e., the detectable threshold levels are widely spaced apart from each other) due to power consumption and design reasons. Based on this invention, the detection resolution can be enhanced from 10 mV steps to <1 mV steps. This makes the detection configuration more accurate, which allows for improved calibration, and reduces false wake-ups by smartly controlling hardware at no additional cost in power consumption. In some embodiments, the invention to enable high resolution configuration of a low-power wake-up detector (LP Detector) can be implemented by using a wake-up threshold control to control both a low-power wake-up detector (LP Detector) and an attenuator belonging to a receiver.

20 Claims, 8 Drawing Sheets

FIG. 1

Receiver operating under a single fixed attenuator gain setting
and multiple detector threshold settings

Receiver operating under multiple attenuator gain settings
and multiple detector threshold settings

Receiver operating under multiple attenuator gain settings
and a single detector threshold setting

Receiver operating under multiple attenuator gain settings
and two detector threshold settings

SYSTEM AND METHOD FOR CONFIGURABLE LOW-POWER WAKE-UP DETECTION

FIELD

The described embodiments relate generally to systems and methods for detection of an input RF (radio frequency) signal, and more particularly to systems and methods for a high-resolution low-power detection of an input RF (radio frequency) signal.

BACKGROUND

Standby is a preferred power state for a RF (radio frequency) receiver device, when no activity is expected, because standby mode saves power. With standby mode, there is a need for methods and devices to wake-up the RF receiver device, which for example can be a NFC (Near Field Communication) enabled receiver device. This wake-up process requires enhanced resolution for input signal strength detection in order, for example, to reduce false wake-ups, which waste power.

Therefore, there are strong motivations for methods and devices that can provide for enhanced resolution for input signal strength detection in a RF receiver device.

SUMMARY

This specification discloses methods and devices to enable high resolution configuration of a low-power wake-up detector (LP Detector), which in turn is implemented allowing for very coarse threshold detection (e.g., the LP Detector can only detect threshold levels, which are widely spaced apart from each other) due to power consumption and design reasons. Based on this invention, the detection resolution can be enhanced from 10 mV steps to <1 mV steps (at 50 mV). This makes the detection configuration more accurate, which allows for improved calibration, and reduces false wake-ups by smartly controlling HW (hardware) at no additional cost in power consumption. In some embodiments, the invention (to enhance the detection resolution and reduce false wake-ups) can be implemented by smartly controlling existing HW (hardware) at no additional cost in power consumption.

In some embodiments, the invention to enable high resolution configuration of a low-power wake-up detector (LP Detector) can be implemented for a receiver, such as a NFC-enabled receiver (where NFC stands for Near Field Communication). In some embodiments, the invention to enable high resolution configuration of a low-power wake-up detector (LP Detector) can be implemented by using a wake-up threshold control to also vary a gain setting of an attenuator belonging to the receiver. The attenuator can be configured for a multiple number of different attenuator gain settings, which in turn allows for higher resolution wake-up detection, even though the low-power wake-up detector (LP Detector) itself might have been implemented allowing for only very coarse threshold detection (e.g., the LP Detector can only detect threshold levels, which are widely spaced apart from each other) due to power consumption and design reasons. In other words, higher resolution wake-up detection may be achieved by also varying the attenuator gain settings, instead of only varying the low-power wake-up detector (LP Detector) threshold levels. In some embodiments, a high-resolution configuration of a low-power wake-up detector (LP Detector) can be implemented by using a wake-up threshold control to control both the low-power wake-up detector (LP Detector) and an attenuator belonging to a receiver.

The present invention provides for a device configured for high-resolution wake-up detection, the device comprising: (a) a receiver, the receiver configured to receiving an input RF (radio frequency) signal, wherein the receiver comprises an attenuator, the attenuator configured to attenuate the input RF signal for output as an attenuated RF signal, wherein the attenuator is configured for a limited number of different attenuator gain settings; (b) a detector, the detector configured to compare the attenuated RF signal to a limited number of different reference threshold levels; (c) a wake-up threshold control, the wake-up threshold control configured to receive a pre-determined signal threshold level, the wake-up threshold control further configured to map the pre-determined signal threshold level to a specific attenuator gain setting and a specific reference threshold level.

In some embodiments, mapping the pre-determined signal threshold level to the specific attenuator gain setting and the specific reference threshold level enables the detector to detect an effective signal threshold level for the input RF signal that is close to the pre-determined signal threshold level.

In some embodiments, the detector is further configured to output a wake-up signal in response to determining that the input RF signal is higher than the effective signal threshold level.

In some embodiments, an ability to change the specific attenuator gain setting enables the effective signal threshold level to be selected with higher resolution than if the specific attenuator gain setting is fixed and cannot be changed.

In some embodiments, the pre-determined signal threshold level is a measure of signal strength, wherein the detector is configured to compare a signal strength of the attenuated RF signal to an attenuated effective signal threshold level.

In some embodiments, the signal strength of the attenuated RF signal is determined based on one or more of the following: (i) a voltage of the attenuated RF signal, (ii) a power of the attenuated RF signal, (iii) a current of the attenuated RF signal.

In some embodiments, the limited number of different reference threshold levels is a single level or only two levels.

In some embodiments, the specific attenuator gain setting and the specific reference threshold level selected for mapping to the pre-determined signal threshold level are based on one of the following: (i) a first look-up table for the limited number of different attenuator gain settings, a second look-up table for the limited number of different reference threshold levels, and a function to connect the first look-up table and the second look-up table; (ii) a first function for the limited number of different attenuator gain settings, a second function for the limited number of different reference threshold levels, and a third function to connect the first function and the second function; (iii) a single look-up table for both the limited number of different attenuator gain settings and the limited number of different reference threshold levels; (iv) a single function for both the limited number of different attenuator gain settings and the limited number of different reference threshold levels; (v) any combination of look-up tables and functions for the limited number of different attenuator gain settings and the limited number of different reference threshold levels.

In some embodiments, the wake-up threshold control is implemented as one of the following: (i) a software functional block, (ii) a hardware functional block, (iii) a functional block comprising both software and hardware.

In some embodiments, the detector is a low-power detector capable of operation with low power consumption because the detector is restricted to detecting only the limited number of reference threshold levels.

In some embodiments, the wake-up signal enables the device to wake up from a power saving standby mode.

In some embodiments, the receiver is configured for receiving the RF signal for one of the following: (i) a NFC-enabled device, wherein NFC stands for Near Field Communication, (ii) an IOT device, wherein IOT stands for Internet of Things, (iii) a WSN device, wherein WSN stands for Wireless Sensor Network.

In some embodiments, the receiver further comprises: (i) a down converter, wherein the attenuator is further configured to output the attenuated RF signal to the down converter.

In some embodiments, the receiver further comprises: (ii) a BBA (baseband amplifier), (iii) an ADC (analog-to-digital converter).

In some embodiments, the attenuator is used as a passive device which does not consume power.

In some embodiments, the limited number of different reference threshold levels associated with the detector are comprising of: (i) equidistant signal levels, (ii) non-equidistant signal levels.

In some embodiments, the limited number of different attenuator gain settings associated with the attenuator are comprising of: (i) equidistant attenuation gain levels, (ii) non-equidistant attenuation gain levels.

The present invention provides for a method to enhance resolution for signal strength detection, the method comprising: (a) using a receiver of a device to receive an input RF (radio frequency) signal; (b) using an attenuator of the receiver to attenuate the input RF signal for output as an attenuated RF signal to a detector of the device, wherein the attenuator is configured for a limited number of different attenuator gain settings, wherein the detector is configured to compare the attenuated RF signal to a limited number of different reference threshold levels; (c) using a wake-up threshold control to map a pre-determined signal threshold level to a specific attenuator gain setting and a specific reference threshold level, wherein the mapping enables the detector to detect an effective signal threshold level for the input RF signal that is close to the pre-determined signal threshold level; (d) using the detector to determine if the input RF signal is higher than the effective signal threshold level.

In some method embodiments, the method further comprising: (e) using the detector to output a wake-up signal in response to determining that the input RF signal is higher than the effective signal threshold level.

The present invention provides for a computer program product comprising executable instructions encoded in a non-transitory computer readable medium which, when executed by a device, carry out or control a method to enhance resolution for signal strength detection, the method comprising: (a) using a receiver of the device to receive an input RF (radio frequency) signal; (b) using an attenuator of the receiver to attenuate the input RF signal for output as an attenuated RF signal to a detector of the device, wherein the attenuator is configured for a limited number of different attenuator gain settings, wherein the detector is configured to compare the attenuated RF signal to a limited number of different reference threshold levels; (c) using a wake-up threshold control to map a pre-determined signal threshold level to a specific attenuator gain setting and a specific reference threshold level, wherein the mapping enables the detector to detect an effective signal threshold level for the input RF signal that is close to the pre-determined signal threshold level; (d) using the detector to determine if the input RF signal is higher than the effective signal threshold level.

The above summary is not intended to represent every example embodiment within the scope of the current or future Claim sets. Additional example embodiments are discussed within the Figures and Detailed Description below. Other aspects and advantages of embodiments of the present invention will become apparent from the following detailed description taken in conjunction with the accompanying drawings.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Figure 1:
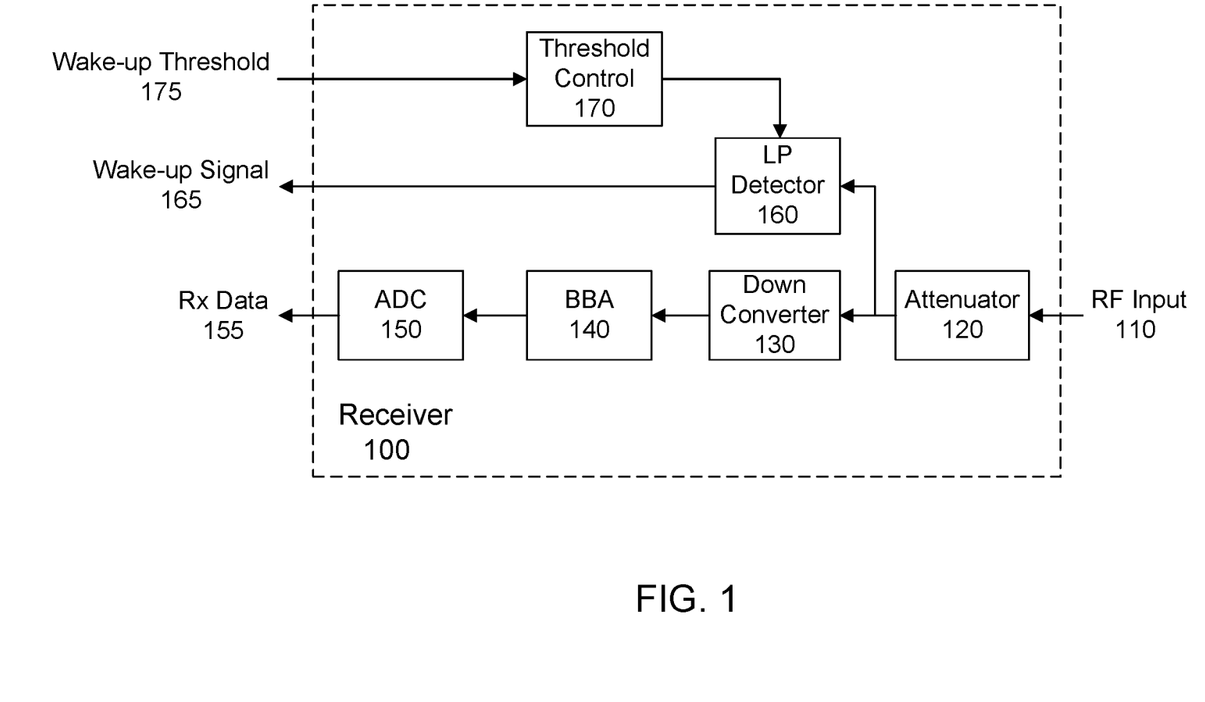
FIG. 1 shows a functional block diagram of a receiver (Rx) enabled for wake-up detection from standby mode, where the receiver includes a low-power wake-up detector (LP Detector) and a threshold control unit (which controls only the LP Detector).

FIG. 1 shows a functional block diagram of a receiver (Rx) 100 enabled for wake-up detection from standby mode, where the receiver includes a low-power wake-up detector (LP Detector) and a threshold control unit (which controls only the LP Detector). As shown in FIG. 1, a receiver (Rx) 100 includes an attenuator 120, a down converter 130, a BBA (baseband amplifier) 140, an ADC (analog to digital converter) 150, a low-power wake-up detector (LP Detector) 160, and a threshold control 170.

FIG. 1 shows the low-power wake-up detector (LP Detector) 160 and the threshold control 170 are within the receiver 100. But, in some embodiments, the low-power wake-up detector (LP Detector) 160 and the threshold control 170 can be outside the receiver 100, with appropriate connections to the relevant components (e.g., attenuator 120) within the receiver 100.

In some embodiments, the receiver receives a RF (radio frequency) input signal 110. The RF input signal 110 is first sent to the attenuator 120. Then, in one path, the attenuator 120 sends the attenuated RF input signal on to the down converter 130, the BBA (baseband amplifier) 140, and the ADC (analog to digital converter) 150. The ADC 150, in turn, outputs Rx data 155. In another path, the attenuator 120 sends the attenuated RF input signal on to the low-power wake-up detector (LP Detector) 160. The LP Detector 160 is configured to compare the attenuated RF input signal to a reference threshold level. In some embodiments, if the LP Detector 160 determines that the attenuated RF input is higher than the reference threshold level, then the LP Detector 160 is further configured to output a Wake-up Signal 165. In some embodiments, the threshold control 170 receives a Wake-up Threshold 175 (e.g., desired target RF input level), and then the threshold control 170 provides a reference threshold level to the LP Detector 160 based on the Wake-up Threshold 175. In some embodiments, the LP Detector 160 can be configured for comparing the attenuated RF input to a limited number of different reference threshold levels available (due to an implementation based on power consumption and design reasons). Then, from the limited number of different reference threshold levels available, the threshold control 170 can determine a reference threshold level that is closest to the Wake-up Threshold 175, or a lower reference threshold level that is closest to the Wake-up Threshold 175, or a higher reference threshold level that is closest to the Wake-up Threshold 175. That selected reference threshold level can then be provided to the LP Detector 160.

The low-power wake-up detector (LP Detector) 160 is a functional block with the purpose to wake-up a RF (radio frequency) receiver from standby. In some embodiments, the RF receiver can belong to a NFC (Near Field Communication) device (in card-mode), so the low-power wake-up detector (LP Detector) 160 is a functional block with the purpose to wake-up a NFC (Near Field Communication) device (in card-mode) from standby. As standby is the preferred power state (when no activity is expected), there is the need for a method to wake-up the device. In some embodiments, one key requirement for the wake-up detector is power efficiency, which is traded for accuracy and resolution.

This trade-off is due to the implementation of a limited number of (accurate) reference voltage levels, with capabilities for trim, temperature compensation, etc.

As the main performance gating detector is NFCLD (where the design target is accuracy), a device needs to pass two level detectors before being able to respond to a RF (radio frequency) event. First the low-power wake-up detector (LP-Detector) needs to wake-up the system, and then secondly, the NFCLD as performance gate.

In order to ensure there is no performance impact from LP-Detector to NFCLD, the LP-Detector needs to wake-up the system at a lower threshold level (including PVT variation) than the NFCLD (including PVT variation) (where PVT stands for 'process, voltage and temperature'). In turn, these two thresholds are guard-banded with sufficient margin to ensure the criteria. Consequently, normal programming with high margin between the thresholds may cause false wake-ups as a side-effect due to the very low configured threshold for the LP-Detector. As a matter of fact, false wake-ups will cause some power drain due to activation of the device (for example, boot-up of firmware, keep system alive till a time-out, etc.).

Next, the limited resolution of the LP-Detector configuration makes an accurate calibration (to compensate for IC (integrated circuit) variance as well as for matching network and antenna variance inefficiencies).

FIG. 1 is an example of a system with the LP-Detector 160 HW-block, its configuration unit (Threshold Control 170), and the receiver (Rx) 100. The system also includes a matching network and an antenna, which are not shown in FIG. 1.

As described earlier, in some embodiments, the LP Detector 160 can be configured for comparing the attenuated RF input to a limited number of different reference threshold levels available (due to an implementation based on power consumption and design reasons). In one embodiment, an implementation can allow for 10-15 dedicated threshold levels (between 10 to 150 mV), and a simple (though efficient) calibration algorithm that allows to quantize any desired target wake-up threshold to the available HW settings (i.e., the 10-15 dedicated threshold levels between 10 to 150 mV).

Figure 2A:
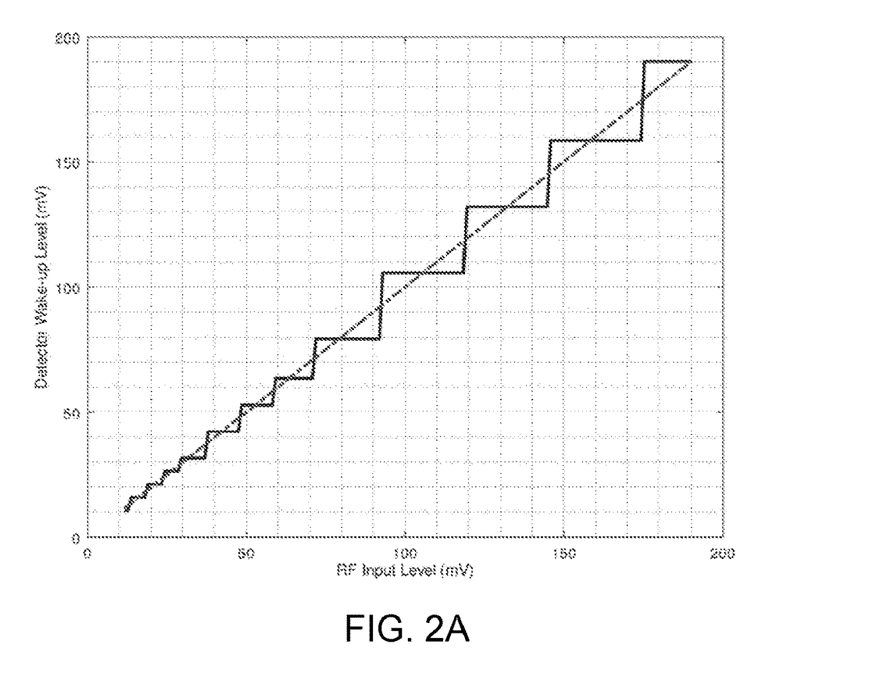
FIG. 2A shows a plot of available detector (i.e., LP Detector only) wake-up level versus desired target RF (radio frequency) input level (where a receiver is operating under a single fixed attenuator gain setting and multiple detector threshold settings).

FIG. 2A shows an example of how a simple (though efficient) calibration algorithm can be allowed to quantize any desired target wake-up threshold to the available HW settings (i.e., the 10-15 dedicated threshold levels between 10 to 150 mV). In particular, the y-axis (i.e., vertical axis) shows the available HW settings (i.e., the 10-15 dedicated threshold levels between 10 to 150 mV). The x-axis (i.e., horizontal axis) shows the desired target wake-up threshold.

In FIG. 2A, a solid line shows the mapping of the desired target wake-up threshold to the available HW settings (i.e., the 10-15 dedicated threshold levels between 10 to 150 mV), while a dashed line shows the y=x line (i.e., one-to-one matching line). In other words, the dashed line shows an "ideal" mapping line, where the HW settings can allow all possible threshold levels (i.e., "infinite" dedicated threshold levels between 10 to 150 mV), so that the LP-Detector can accurately detect all possible desired target wake-up threshold values.

However, because the LP-Detector cannot detect all possible desired target wake-up threshold values (and can, in fact, only detect 10-15 dedicated threshold levels between 10 to 150 mV), the solid line shows that the mapping of the desired target wake-up threshold to the available HW settings is a step function.

For example, one of the dedicated threshold levels is 80 mV, so all desired target wake-up threshold values from 72 mV to 91 mV are mapped to the HW setting of 80 mV (on the y-axis). As another example, the next dedicated threshold levels is 107 mV, so all desired target wake-up threshold values from 91 mV to 119 mV are mapped to the HW setting of 107 mV (on the y-axis).

The quantized mapping of the solid line step function is not ideal, because there is an error in the accuracy of detecting a desired target wake-up threshold. For example, a desired target wake-up threshold values of 72 mV mapped to the HW setting of 80 mV results in a relative error=(80−72)/80=10%. Similarly, a desired target wake-up threshold values of 92 mV mapped to the HW setting of 80 mV results in a relative error=(80−91)/80=−14%.

Figure 2B:
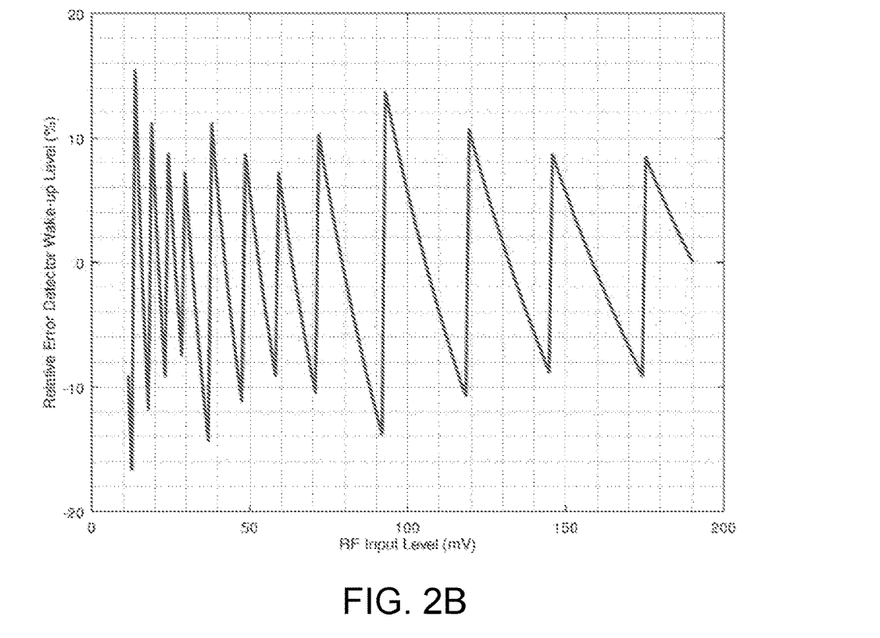
FIG. 2B shows a plot of relative error of available detector (i.e., LP Detector only) wake-up level versus desired target RF (radio frequency) input level (where a receiver is operating under a single fixed attenuator gain setting and multiple detector threshold settings).

In this regard, FIG. 2B shows the relative error of the mapping shown in FIG. 2A.

FIG. 2B shows that the relative error is in the range of +/−15% (depending on the threshold level), and increases for the most sensitive (lowest) threshold levels (if system level calibration is performed). Otherwise, if system level calibration is not performed, the relative error would be in the range of +/−25% for the same scenarios.

Furthermore, FIG. 1 shows that the attenuator 120 is not being controlled by any other functional blocks, so that the attenuator 120 gain setting should be a single fixed value. Therefore, for both FIGS. 2A and 2B, the receiver is operating under a single fixed attenuator gain setting and multiple detector threshold settings.

In summary, FIG. 2A shows a plot of available detector (i.e., LP Detector only) wake-up level versus desired target RF (radio frequency) input level (where a receiver is operating under a single fixed attenuator gain setting and multiple detector threshold settings). FIG. 2B shows a plot of relative error of available detector (i.e., LP Detector only) wake-up level versus desired target RF (radio frequency) input level (where a receiver is operating under a single fixed attenuator gain setting and multiple detector threshold settings).

In order to achieve a high-resolution low-power detection of an input RF signal (with a lower relative error), it would be desirable for the FIG. 2A solid line (which is a step function with large steps) to become more like the FIG. 2A dashed line (which is y=x straight line).

Figure 3:
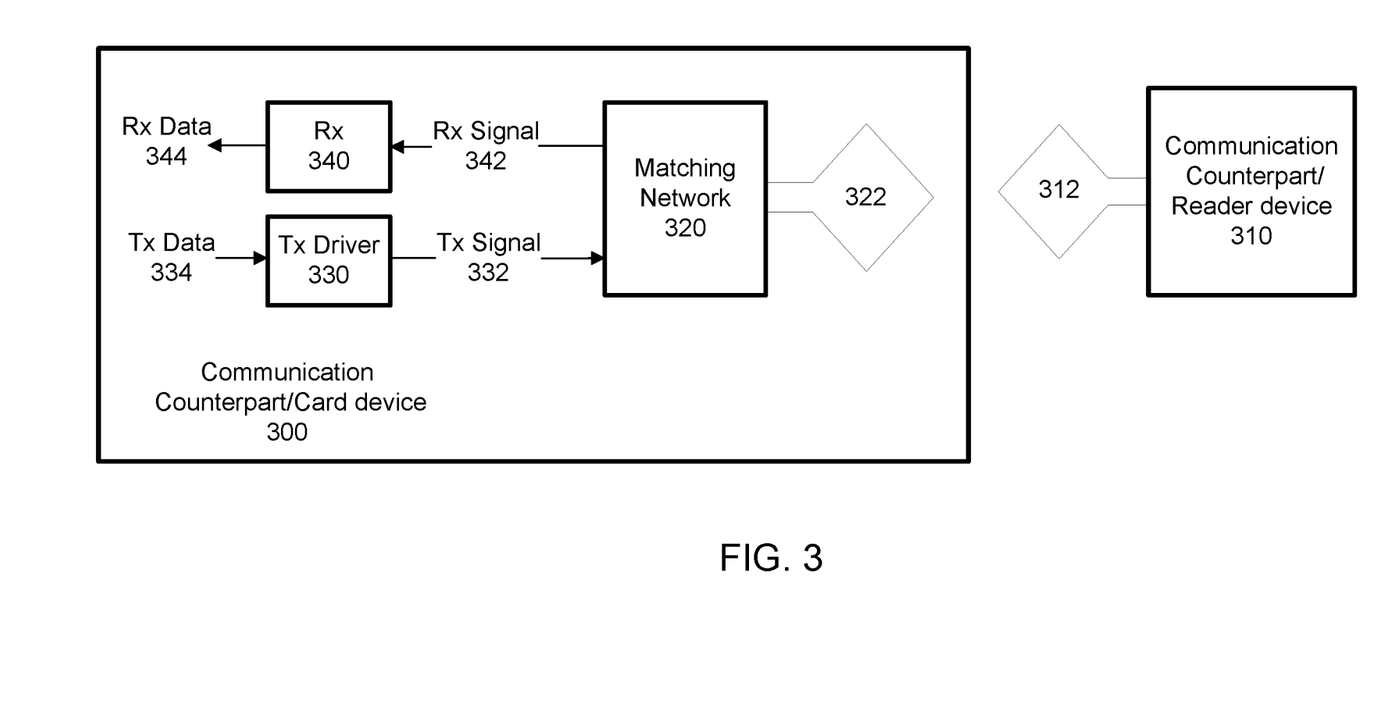
FIG. 3 shows a functional block diagram of a NFC (Near Field Communication) card-mode device together with a reader device in accordance with some embodiments of the invention.

FIG. 3 shows a functional block diagram of a NFC (Near Field Communication) card-mode device 300 together with a reader device 310 in accordance with some embodiments of the invention. In FIG. 3, the NFC card-mode device 300 is shown to include a Tx (transmitter) driver 330, a Rx (receiver) 340, a matching network 320, and an antenna 322. In general, a NFC card-mode device can include a Tx (transmitter) unit (which can further include a Tx driver, Tx supply, etc.), a Rx (receiver) unit, a matching network, and an antenna. FIG. 3 shows that the Tx driver 330 receives Tx data 334 as input, and then transmits Tx signal 332 as output. FIG. 3 also shows that the Rx 340 receives Rx data 342 as input, and then transmits Rx data 344 as output.

FIG. 3 also shows a communication counterpart reader device 310 together with an antenna 312. In some embodiments, the reader device 310 can initiate communication by generating a field and then sending a signal to the NFC card-mode device 300.

In some embodiments, the NFC card-mode device 300 is in standby mode for power savings. Therefore, the signal from the reader device 310 can be used by the NFC card-mode device 300 to wake-up from standby mode. In some embodiments, the signal from the reader device 310 can be used by a low-power wake-up detector (LP Detector) in the NFC card-mode device 300 to wake-up the Rx (receiver) 340 from standby mode.

Figure 4:
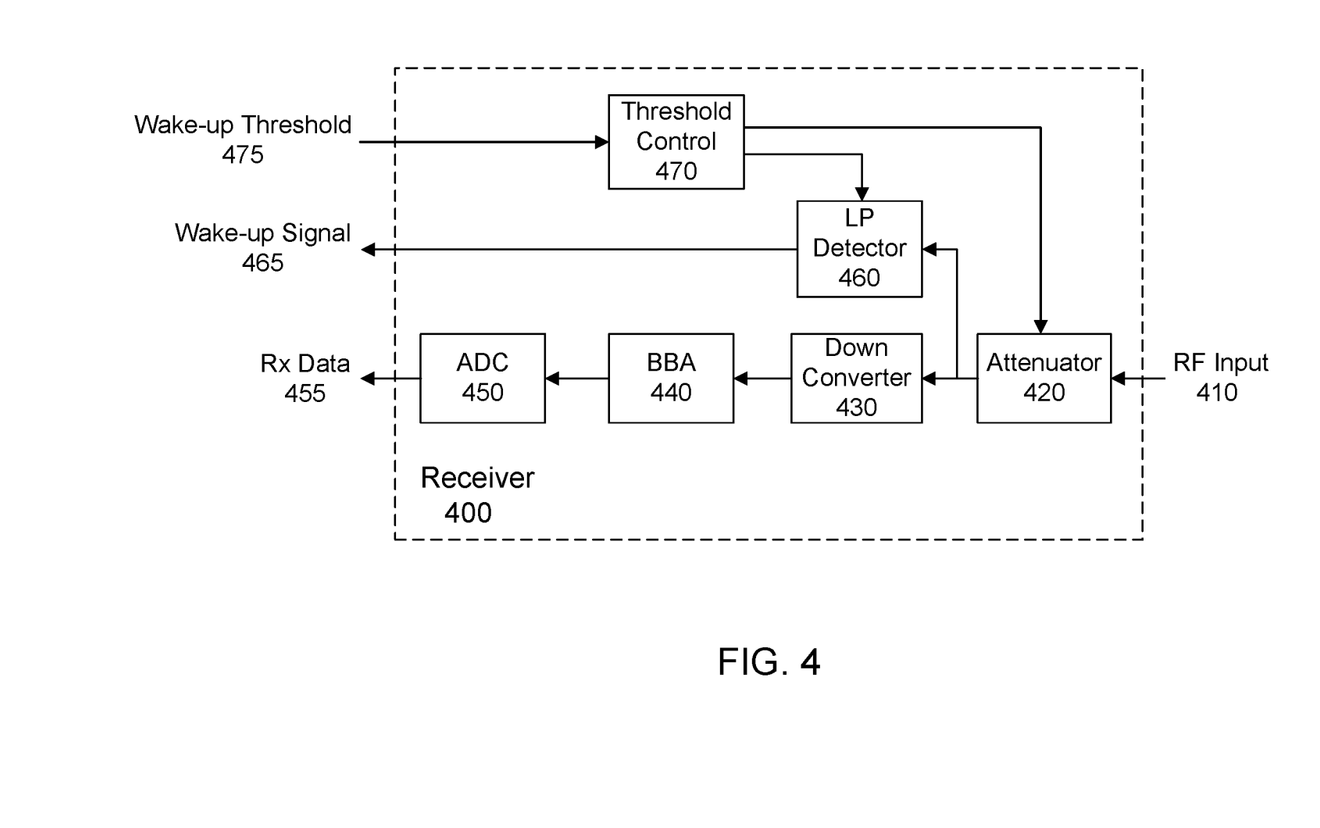
FIG. 4 shows a functional block diagram of a receiver (Rx) enabled for high-resolution wake-up detection from standby mode, where the receiver includes a low-power wake-up detector (LP Detector) and a threshold control unit (which controls both the LP Detector and an attenuator) in accordance with some embodiments of the invention.

FIG. 4 shows a functional block diagram of a receiver (Rx) enabled for high-resolution wake-up detection from standby mode, where the receiver includes a low-power wake-up detector (LP Detector) and a threshold control unit (which controls both the LP Detector and an attenuator) in accordance with some embodiments of the invention. As shown in FIG. 4, a receiver (Rx) 400 includes an attenuator 420, a down converter 430, a BBA (baseband amplifier) 440, an ADC (analog to digital converter) 450, a low-power wake-up detector (LP Detector) 460, and a threshold control 470.

FIG. 4 shows the low-power wake-up detector (LP Detector) 460 and the threshold control 470 are within the receiver 400. But, in some embodiments, the low-power wake-up detector (LP Detector) 460 and the threshold control 470 can be outside the receiver 400, with appropriate connections to the relevant components (e.g., attenuator 420) within the receiver 400.

In many ways, FIG. 4 is similar to FIG. 1. For example, the receiver (Rx) 400 receives a RF input signal 410. The threshold control 470 receives a Wake-up Threshold 475. The ADC 450 outputs Rx data 455. The LP Detector 460 outputs Wake-up Signal 465.

However, there is one major difference between FIG. 4 and FIG. 1. In FIG. 4, the threshold control 470 is configured to control both the LP Detector 460 and the attenuator 420, while in FIG. 1, the threshold control unit is configured to only control the LP Detector. This is because the attenuator gain setting can be varied for higher resolution wake-up detection.

Therefore, higher resolution wake-up detection is achieved by combining the limited number of LP Detector thresholds that are available from the HW detector with the ability to change the gain setting of the HF (high frequency) attenuator as shown in FIG. 4. It has to be emphasized that the attenuator is a passive device, so the threshold programming is static (unless the target threshold level is changed). Furthermore, the attenuator can be used even with the device in standby.

As a combined control of the wake-up threshold, the coarse threshold is done with the HW-settings of the LP Detector, while the high resolution is achieved with small configuration (attenuation) steps from the attenuator (i.e., changing the attenuator gain settings).

By combining, the coarse steps of, for example, 10 mV (at a 50 mV threshold) can be reduced to a resolution of <1 mV. In turn, that means an improvement by a factor of 10. Furthermore, the relative error is also reduced from approximately +/−15% to approx. +/−2.5%.

Consequently, the improved resolution can immediately be used for:

(a) System calibration to compensate gain/attenuation in the antenna/matching network gain;

(b) Reducing the threshold delta between LP-Detector and NFCLD to reduce the number of false wake-ups;

(c) Allowing for device level calibration with improved resolution (e.g., temperature compensation).

Figure 5A:
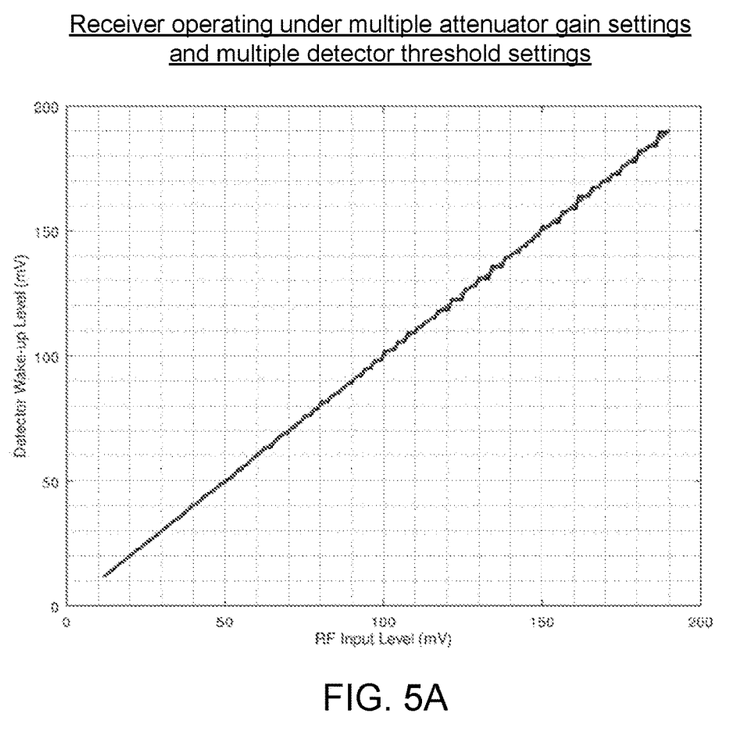
FIG. 5A shows a plot of detector (i.e., LP Detector plus attenuator) wake-up level versus desired target RF (radio frequency) input level (where a receiver is operating under multiple attenuator gain settings and multiple detector threshold settings) in accordance with some embodiments of the invention.
Figure 5B:
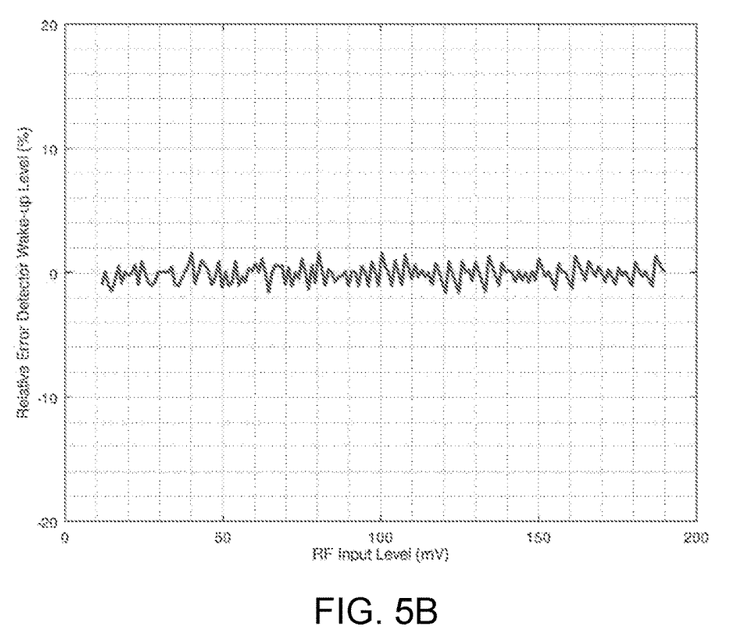
FIG. 5B shows a plot of relative error of detector (i.e., LP Detector plus attenuator) wake-up level versus desired target RF (radio frequency) input level (where a receiver is operating under multiple attenuator gain settings and multiple detector threshold settings) in accordance with some embodiments of the invention.

The performance of the enhanced low-power detection (achieved through combining the control of both the LP Detector and the attenuator) is shown in FIG. 5A, while the reduction in relative error is shown in FIG. 5B. Note that FIGS. 5A and 5B can be generated by a receiver device as shown in FIG. 4.

FIG. 4 shows that the threshold control 470 is configured to control both the LP Detector 460 and the attenuator 420, so that both the LP-detector HW-settings and the attenuator gain settings can be varied. In other words, for both FIGS. 5A and 5B, the receiver is operating under multiple attenuator gain settings and multiple detector threshold settings.

In FIG. 5A, a solid line shows the mapping of the desired target wake-up threshold to the available HW settings (i.e., by varying both the attenuator gain settings and detector threshold settings), while a dashed line shows the y=x line (i.e., one-to-one matching line). It can be seen in FIG. 5A that the solid line is now much more like the dashed line, as compared to FIG. 2A. Similarly, the relative error shown in FIG. 5B is also now much lower, than as compared to FIG. 2B. As explained earlier, the higher resolution wake-up detection is achieved by combining the limited number of LP Detector thresholds that are available from the HW detector with the ability to change the gain setting of the HF (high frequency) attenuator, as shown in FIG. 4. As a combined control of the wake-up threshold, the coarse threshold is done with the HW-settings of the LP Detector, while the high resolution is achieved with small configuration (attenuation) steps from the attenuator (i.e., changing the attenuator gain settings).

In summary, FIG. 5A shows a plot of detector (i.e., LP Detector plus attenuator) wake-up level versus desired target RF (radio frequency) input level (where a receiver is operating under multiple attenuator gain settings and multiple detector threshold settings) in accordance with some embodiments of the invention. FIG. 5B shows a plot of relative error of detector (i.e., LP Detector plus attenuator) wake-up level versus desired target RF (radio frequency) input level (where a receiver is operating under multiple attenuator gain settings and multiple detector threshold settings) in accordance with some embodiments of the invention.

To better understand FIGS. 5A and 5B, please consider following example of operation:

The LP-Detector hardware thresholds are 5, 10, 15, 25, . . . , 100 mV (referenced to the chip input VRX (i.e., a voltage of receiver Rx)).

The attenuator is comprised of a Ragc,max=7.5 kohms, Rext=400 ohms, so Gain=0.94.

Consequently, for the LP-Detector threshold setting of 10 mV and a max gain setting (Ragc=7.5 k), the effective threshold referenced to VRexternal is 10 mV/0.94=10.64 mV. For threshold setting of 15 mV, the effective threshold will be 15 mV/0.94=15.96 mV.

Now applying different HFatt (HF attenuator) settings gives the following gain values:

Code 0→Ragc=7.5 k→Gain=0.94
Code 1→Ragc=6 k→Gain=0.93
Code 2→Ragc=5 k→Gain=0.92
Code 3→Ragc=4 k→Gain=0.90

Consequently, the effective wake-up threshold will be:

Code 0→Ragc=7.5 k→Threshold=10 mV/0.94=10.64 mV
Code 1→Ragc=6 k→Threshold=10 mV/0.93=10.75 mV
Code 2→Ragc=5 k→Threshold=10 mV/0.92=10.87 mV
Code 3→Ragc=4 k→Threshold=10 mV/0.90=11.11 mV
. . .

which are clearly significantly smaller steps than the one using the LP-Detector HW setting of 15 mV.

It is important to note that the method allows a relative change of the threshold imposed by the HW setting. This means that, for lowest HW settings (e.g. 10 mV), a relative change is the same, though the absolute is below 0.2 mV, while for a HW setting of 50 mV, the absolute change is about 1 mV.

In some embodiments, a method to enhance resolution for signal strength detection comprises using an "enhanced" threshold control to control both the low-power wake-up detector (LP Detector) HW block and an attenuator of a receiver, as shown in FIG. 4. In some embodiments, an implementation of the "enhanced" threshold control is to select the closest HW threshold setting to the desired target threshold, with this closest HW threshold setting serving as the "coarse" threshold. In some embodiment, the default selection of the attenuator is code=0, which is equivalent to minimum attenuation. In some embodiments, the "fine" threshold is achieved by tuning the attenuator from a default of code=0 (which represents no attenuation) to higher attenuation, which in turn increases the threshold level.

Figure 6A:
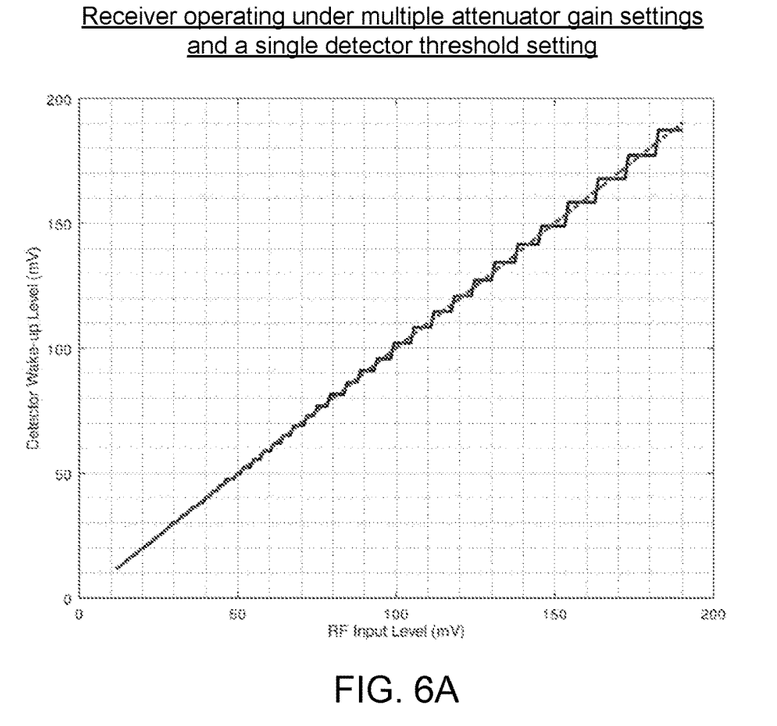
FIG. 6A shows a plot of detector (i.e., attenuator only) wake-up level versus desired target RF (radio frequency) input level (where a receiver is operating under multiple attenuator gain settings and a single detector threshold setting) in accordance with some embodiments of the invention.
Figure 6B:
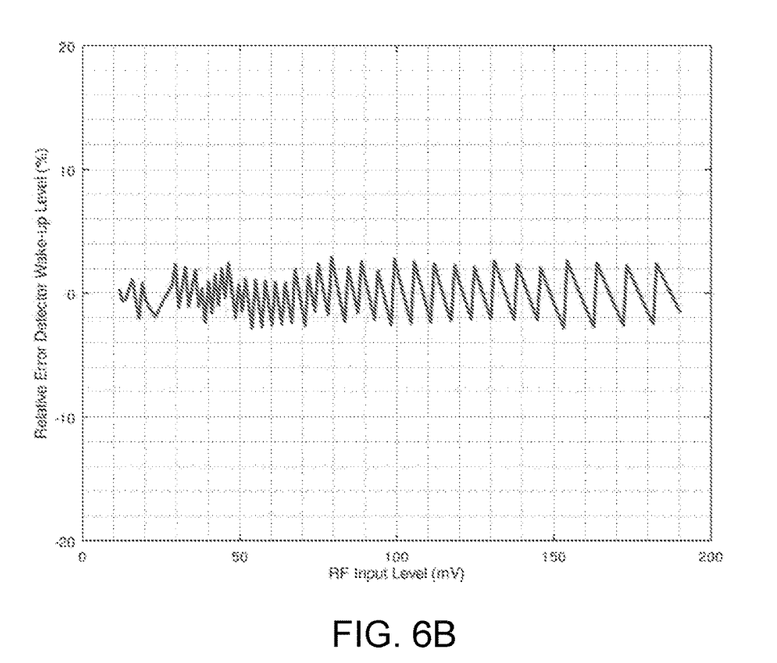
FIG. 6B shows a plot of relative error of detector (i.e., attenuator only) wake-up level versus desired target RF (radio frequency) input level (where a receiver is operating under multiple attenuator gain settings and a single detector threshold setting) in accordance with some embodiments of the invention.

In some embodiments, it can be shown that higher resolution wake-up detection is possible simply by using a single detector threshold setting and only varying the attenuator gain setting. FIGS. 6A and 6B shows the performance of such an enhanced low-power detection. In FIG. 6A, a solid line shows the mapping of the desired target wake-up threshold to the available HW settings (i.e., by varying only the attenuator gain settings and fixing the detector threshold setting to a single value), while a dashed line shows the y=x line (i.e., one-to-one matching line). It can be seen in FIG. 6A that the solid line is showing slightly more deviation from the dashed line, as compared to FIG. 5A. This is because FIG. 6A keeps the detector threshold setting fixed to a single value, while FIG. 5A can vary the detector threshold setting, so FIG. 5A can achieve slightly higher resolution low-power detection. But both FIGS. 6A and 5A are much more like the dashed line, as compared to FIG. 2A. This is because both FIGS. 6A and 5A can vary the attenuator gain settings, which can provide the high-resolution wake-up detection.

Similar results can be seen for the relative error shown in FIG. 6B. Again, the FIG. 6B relative error is slightly higher, as compared to FIG. 5B. But the FIG. 6B relative error is much lower, than as compared to FIG. 2B.

In summary, FIG. 6A shows a plot of detector (i.e., attenuator only) wake-up level versus desired target RF (radio frequency) input level (where a receiver is operating under multiple attenuator gain settings and a single detector threshold setting) in accordance with some embodiments of the invention. FIG. 6B shows a plot of relative error of detector (i.e., attenuator only) wake-up level versus desired target RF (radio frequency) input level (where a receiver is operating under multiple attenuator gain settings and a single detector threshold setting) in accordance with some embodiments of the invention.

Figure 7A:
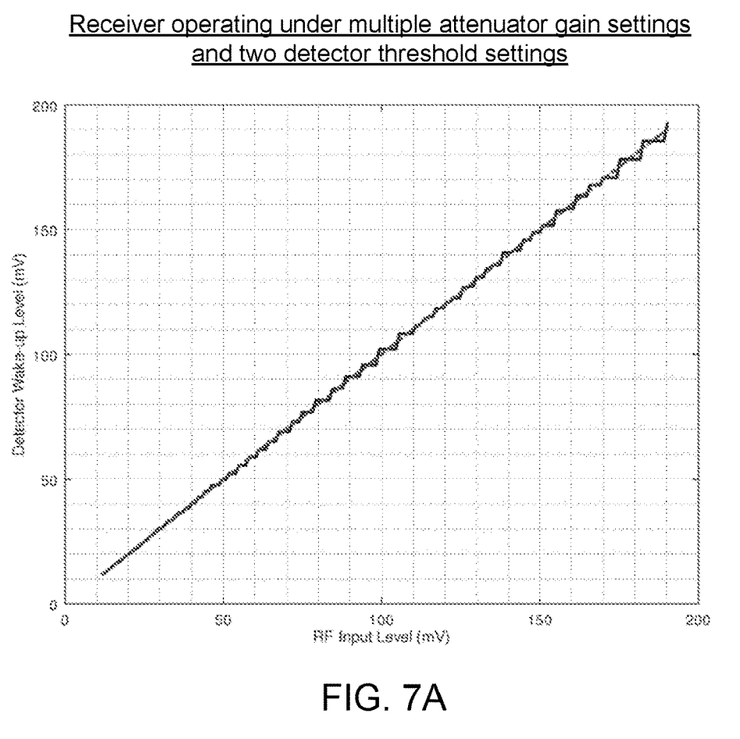
FIG. 7A shows a plot of detector (i.e., LP Detector plus attenuator) wake-up level versus desired target RF (radio frequency) input level (where a receiver is operating under multiple attenuator gain settings and two detector threshold settings) in accordance with some embodiments of the invention.
Figure 7B:
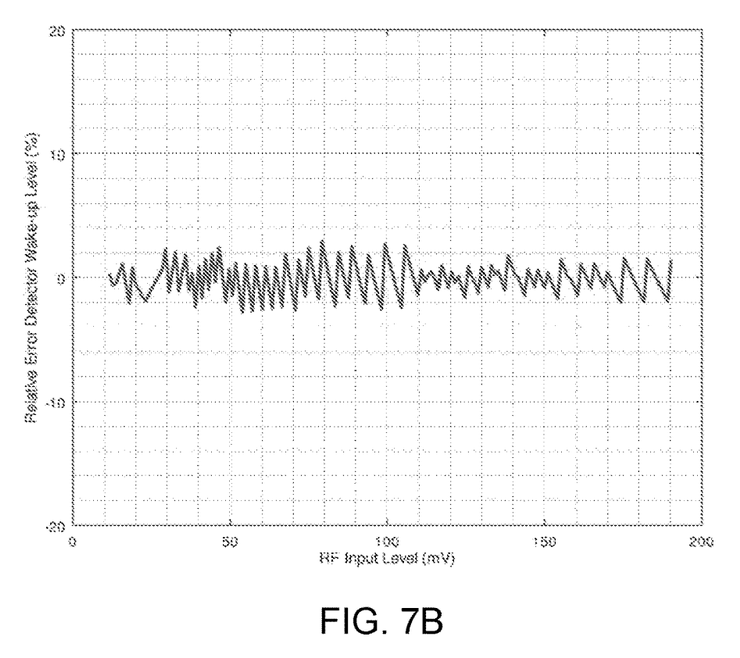
FIG. 7B shows a plot of relative error of detector (i.e., LP Detector plus attenuator) wake-up level versus desired target RF (radio frequency) input level (where a receiver is operating under multiple attenuator gain settings and two detector threshold settings) in accordance with some embodiments of the invention.

In other embodiments, it can be shown that higher resolution wake-up detection is also possible simply by using only two detector threshold settings and varying the attenuator gain setting. FIGS. 7A and 7B shows the performance of such an enhanced low-power detection. In FIG. 7A, a solid line shows the mapping of the desired target wake-up threshold to the available HW settings (i.e., by varying the attenuator gain settings and varying the detector threshold setting between two values), while a dashed line shows the y=x line (i.e., one-to-one matching line). It can be seen in FIG. 7A that the solid line is closer to the dashed line, as compared to FIG. 6A. This is because FIG. 7A can vary the detector threshold setting between two values, while FIG. 6A keeps the detector threshold setting fixed to a single value. Therefore, FIG. 7A can achieve the higher resolution wake-up detection, as compared to FIG. 6A. However, FIG. 7A has lower resolution wake-up detection, as compared to FIG. 5A, which can vary both the attenuator gain settings and detector threshold settings.

Similar results can be seen for the relative error shown in FIG. 7B. Again, the FIG. 7B relative error is slightly lower, as compared to FIG. 6B. But the FIG. 7B relative error is slightly higher, than as compared to FIG. 5B.

In summary, FIG. 7A shows a plot of detector (i.e., LP Detector plus attenuator) wake-up level versus desired target RF (radio frequency) input level (where a receiver is operating under multiple attenuator gain settings and two detector threshold settings) in accordance with some embodiments of the invention. FIG. 7B shows a plot of relative error of detector (i.e., LP Detector plus attenuator) wake-up level versus desired target RF (radio frequency) input level (where a receiver is operating under multiple attenuator gain settings and two detector threshold settings) in accordance with some embodiments of the invention.

Finally, if all the figures are grouped together for a ranking, the order from the highest resolution wake-up detection (lowest relative error) to the lowest resolution wake-up detection (highest relative error) is as follows:

(1) FIGS. 5A and 5B (where a receiver is operating under multiple attenuator gain settings and multiple detector threshold settings);

(2) FIGS. 7A and 7B (where a receiver is operating under multiple attenuator gain settings and two detector threshold settings);

(3) FIGS. 6A and 6B (where a receiver is operating under multiple attenuator gain settings and a single detector threshold setting);

(4) FIGS. 2A and 2B (where a receiver is operating under a single fixed attenuator gain setting and multiple detector threshold settings).

Figure 8:
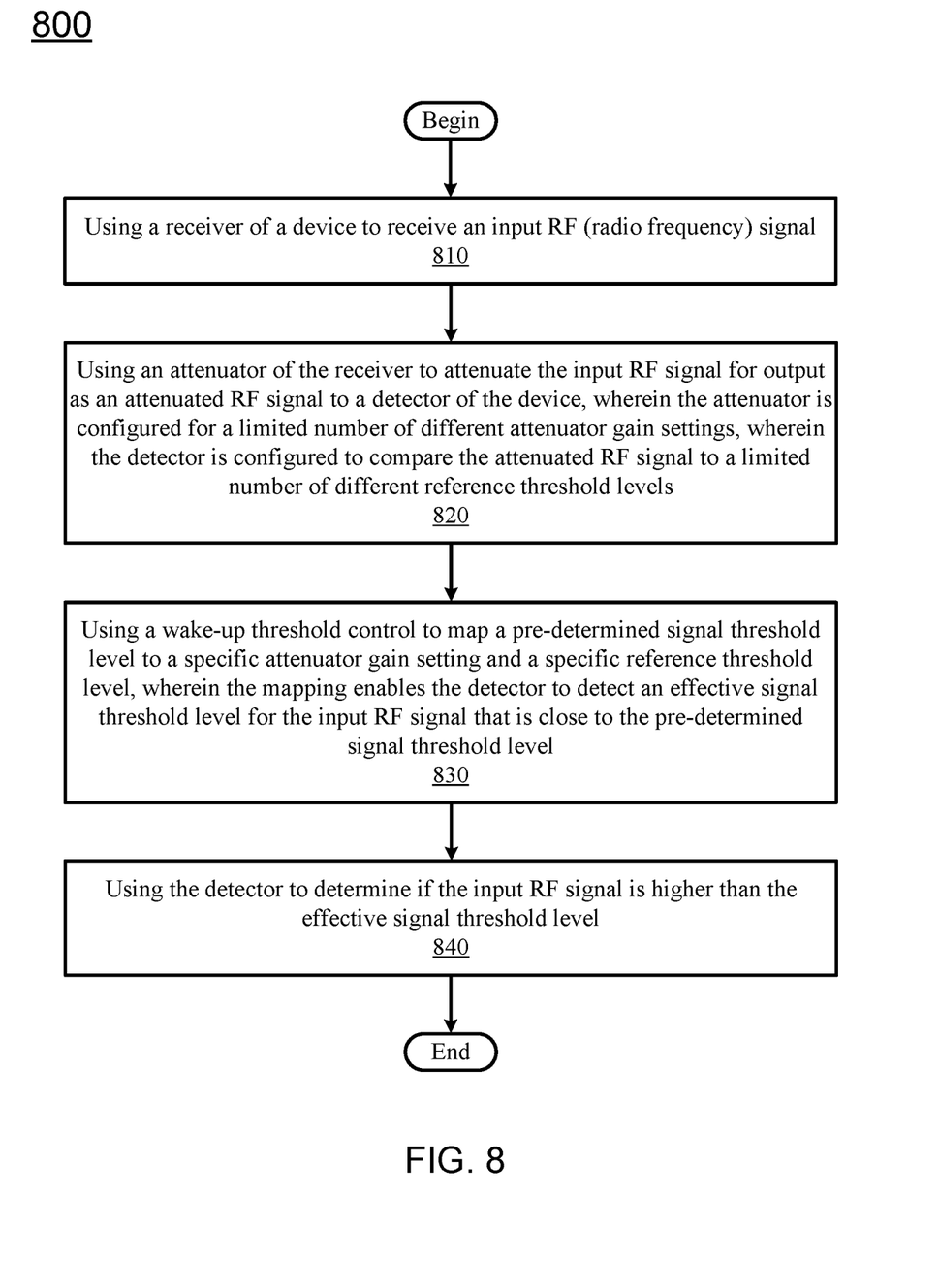
FIG. 8 shows a process flow diagram of a method to enhance resolution for signal strength detection in accordance with some embodiments of the invention.

FIG. 8 shows a process flow diagram of a method to enhance resolution for signal strength detection in accordance with some embodiments of the invention. As shown in FIG. 8, the method 800 begins at step 810, where the method uses a receiver of a device to receive an input RF (radio frequency) signal. Then, the method proceeds to step 820. In step 820, the method uses an attenuator of the receiver to attenuate the input RF signal for output as an attenuated RF signal to a detector of the device, wherein the attenuator is configured for a limited number of different attenuator gain settings, wherein the detector is configured to compare the attenuated RF signal to a limited number of different reference threshold levels. Next, at step 830, the method uses a wake-up threshold control to map a pre-determined signal threshold level to a specific attenuator gain setting and a specific reference threshold level, wherein the mapping enables the detector to detect an effective signal threshold level for the input RF signal that is close to the pre-determined signal threshold level. Finally, at step 840, the method uses the detector to determine if the input RF signal is higher than the effective signal threshold level.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Examples of optical discs include a compact disc with read only memory (CD-ROM), a compact disc with read/write (CD-R/W), a digital video disc (DVD), and a Blu-ray disc.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An integrated circuit device configured for wake-up detection, the device comprising:
   a receiver, the receiver configured to receiving an input RF (radio frequency) signal, wherein the receiver comprises an attenuator, the attenuator configured to attenuate the input RF signal for output as an attenuated RF signal, wherein the attenuator is configured for a limited number of different attenuator gain settings;
   a detector, the detector configured to compare the attenuated RF signal to a subset including one or more of among a subset of different reference threshold levels; and
   a wake-up threshold control, the wake-up threshold control configured to receive a pre-determined signal threshold level, the wake-up threshold control further configured to map the pre-determined signal threshold level to a specific attenuator gain setting and a specific reference threshold level, the specific reference threshold level being in the subset and accessible for use by the detector, wherein the detector is to output a wake-up signal in response to detecting a low level of power relative to the specific reference threshold level, and wherein the wake-up control is to provide the specific reference threshold level to configure the attenuator at a selected one of the subset of different attenuator gain settings.

2. The device of claim 1, wherein mapping the pre-determined signal threshold level to the specific attenuator gain setting and the specific reference threshold level enables the detector to detect an effective signal threshold level for the input RF signal that is close to the pre-determined signal threshold level.

3. The device of claim 2, wherein the detector is further configured to output a wake-up signal in response to determining that the input RF signal is higher than the effective signal threshold level.

4. The device of claim 2, wherein an ability to change the specific attenuator gain setting enables the effective signal threshold level to be selected with higher resolution than if the specific attenuator gain setting is fixed and cannot be changed.

5. The device of claim 2, wherein the pre-determined signal threshold level is a measure of signal strength, wherein the detector is configured to compare a signal strength of the attenuated RF signal to an attenuated effective signal threshold level.

6. The device of claim 5, wherein the signal strength of the attenuated RF signal is determined based on one or more of the following:
   a voltage of the attenuated RF signal,
   a power of the attenuated RF signal,
   a current of the attenuated RF signal.

7. The device of claim 1, wherein the limited subset corresponds to a single level or only two levels.

8. The device of claim 1, wherein the specific attenuator gain setting and the specific reference threshold level selected for mapping to the pre-determined signal threshold level are based on one of the following:
   a first look-up table for the limited number of different attenuator gain settings, a second look-up table for the subset of different reference threshold levels, and a function to connect the first look-up table and the second look-up table;
   a first function for the limited number of different attenuator gain settings, a second function for the subset of different reference threshold levels, and a third function to connect the first function and the second function;
   a single look-up table for both the limited number of different attenuator gain settings and the subset of different reference threshold levels;
   a single function for both the limited number of different attenuator gain settings and the subset of different reference threshold levels; and
   any combination of look-up tables and functions for the limited number of different attenuator gain settings and the subset of different reference threshold levels.

9. The device of claim 1, wherein the wake-up threshold control is implemented as one of the following:
   a software functional block,
   a hardware functional block,
   a functional block comprising both software and hardware.

10. The device of claim 1, wherein the detector is a low-power detector capable of operation with low power consumption because the detector is restricted to detecting only the subset of reference threshold levels.

11. The device of claim 3, wherein the wake-up signal enables the device to wake up from a power saving standby mode.

12. The device of claim 1, wherein the receiver is configured for receiving the RF signal for one of the following:
   a NFC-enabled device, wherein NFC stands for Near Field Communication,
   an IOT device, wherein IOT stands for Internet of Things,
   a WSN device, wherein WSN stands for Wireless Sensor Network.

13. The device of claim 1, wherein the receiver further comprises:
   a down converter, wherein the attenuator is further configured to output the attenuated RF signal to the down converter.

14. The device of claim 13, wherein the receiver further comprises:
   a BBA (baseband amplifier),
   an ADC (analog-to-digital converter).

15. The device of claim 1, wherein the subset of different reference threshold levels associated with the detector include:
   equidistant signal levels, and
   non-equidistant signal levels.

16. The device of claim 1, wherein the limited number of different attenuator gain settings associated with the attenuator include:
  equidistant attenuation gain levels, and
  non-equidistant attenuation gain levels.

17. The device of claim 1, wherein the wake-up threshold control and the detector are to use the specific reference threshold level to increase a resolution for waking up circuitry in the receiver upon detection of a low power being received via the attenuator.

18. An integrated circuit device comprising:
  a receiver, the receiver configured to receive an input RF (radio frequency) signal, wherein the receiver comprises an attenuator, the attenuator configured to attenuate the input RF signal for output as an attenuated RF signal, wherein the attenuator is configured for a limited number of different attenuator gain settings;
  a detector, the detector configured to compare the attenuated RF signal to a subset of different reference threshold levels; and
  a wake-up threshold control configured to receive a pre-determined signal threshold level and to map the pre-determined signal threshold level to a specific attenuator gain setting and a specific reference threshold level, wherein the attenuator is used as a passive device which does not consume power, wherein the detector is to output a wake-up signal in response to detecting a low level of power relative to the specific reference threshold level, and wherein the wake-up threshold control is to provide or output the specific reference threshold level to configure the attenuator at a selected one of the limited number of different attenuator gain settings.

19. A method to enhance resolution for signal strength detection, the method comprising:
  using a receiver of a device to receive an input RF (radio frequency) signal;
  using an attenuator of the receiver to attenuate the input RF signal for output as an attenuated RF signal to a detector of the device, wherein the attenuator is configured for a limited number of different attenuator gain settings, and wherein the detector is configured to compare the attenuated RF signal to a limited number of different reference threshold levels;
  using a wake-up threshold control circuit to map a pre-determined signal threshold level to a specific attenuator gain setting and a specific reference threshold level, wherein the mapping enables the detector to detect an effective signal threshold level for the input RF signal that is close to the pre-determined signal threshold level as one of the different reference threshold levels;
  using the detector to determine if the input RF signal is higher than the effective signal threshold level; and
  using the detector to output a wake-up signal in response to determining that the input RF signal is higher than the effective signal threshold level.

20. A computer program product comprising executable instructions encoded in a non-transitory computer readable medium which, when executed by a device, carry out or control a method to enhance resolution for signal strength detection, the method comprising:
  using a receiver of the device to receive an input RF (radio frequency) signal;
  using an attenuator of the receiver to attenuate the input RF signal for output as an attenuated RF signal to a detector of the device, wherein the attenuator is configured for a limited number of different attenuator gain settings, wherein the detector is configured to compare the attenuated RF signal to a subset including one or more of among a limited number of different reference threshold levels;
  using a wake-up threshold control to map a pre-determined signal threshold level to a specific attenuator gain setting and a specific reference threshold level, wherein the mapping enables the detector to detect an effective signal threshold level for the input RF signal that is close to the pre-determined signal threshold level and, in response, using the detector to output a wake up signal for waking up circuitry in the receiver; and
  using the detector to determine if the input RF signal is higher than the effective signal threshold level.

* * * * *